2,767,153

INTERPOLYMER LATICES AND THE PROCESS
FOR PREPARING THE SAME

Ernest Alexander Sutton, Springfield, Mass., assignor to
Monsanto Chemical Company, St. Louis, Mo., a corporation of Delaware No Drawing. Application November 8, 1954,
Serial No. 467,654

16 Claims. (Cl. 260—29.6)

This invention relates to vinyl polymer latices for use in the preparation of surface coating compositions. More particularly, this invention relates to improved vinyl interpolymer latices useful in the preparation of surface coating compositions and to a process for preparing such latices.

Vinyl polymer latices have been found to have utility as vehicles in the preparation of surface coating compositions of the type commonly referred to as "water-based" paints and surface coating compositions based on conventional vinyl polymer latices have found widespread use in interior applications. However, surface coating compositions of this nature have generally proven to be unsatisfactory for use in exterior applications wherein the latices are subjected to the deleterious effects of sunlight, moisture, wide and rapid variations of temperatures, etc. Satisfactory latices for exterior applications should be capable of drying to form continuous films at low temperatures and, in addition, should be capable of being prepared by a process which gives a stable grain- and lump-free latex that can be used without further treatment.

An object of the present invention is the provision of improved vinyl polymer latices.

Another object is the provision of vinyl polymer latices useful in the preparation of surface coating compositions for exterior applications as well as interior applications.

A further object is the provision of an improved process for preparing vinyl and vinylidene interpolymer latices.

A still further object of this invention is the provision of a process for preparing grain- and lump-free vinyl and vinylidene interpolymer latices that will dry to form hard continuous films which are resistant to the deleterious effects of outdoor exposure.

These and other objects are attained by interpolymerizing in specific proportions, as hereinafter defined, (1) a monovinylidene aromatic hydrocarbon, (2) a member of a restricted class of alkyl esters of acrylic or methacrylic acid, (3) acrylic acid or a mono-phenyl or mono-methyl-substituted acrylic acid and (4) acrylonitrile or methacrylonitrile, the monomers being polymerized by a modified aqueous emulsion catalytic polymerization process wherein polymerization is originally initiated between the monomeric nitrile and a portion of the monovinylidene aromatic hydrocarbon prior to the addition of the remainder of the monomer charge.

The following examples are given in illustration and are not intended as limitations on the scope of this invention. Where parts are mentioned, they are parts by weight.

PREPARATION OF LATICES HAVING A FUSION TEMPERATURE OF LESS THAN ABOUT 10° C.

*Example I*

INTERPOLYMER OF 40% 2-ETHYLHEXYL ACRYLATE, 52% STYRENE, 6% ACRYLONITRILE AND 2% METHACRYLIC ACID

Prepare the following premixes to be used in preparing a 50% solids interpolymer latex:

Monomer premix "A": Parts
  Acrylonitrile _____ 6
  Styrene _____ 14
Monomer premix "B":
  Styrene _____ 38
  2-ethylhexyl acrylate _____ 40
  Methacrylic acid _____ 2
Catalyst premix:
  Potassium persulfate _____ 0.5
  30% solids isopropanol solution of an alkyl aryl
    polyether sulfate _____ 1.0
  Water _____ 25
Reaction vessel charge:
  Alkylaryl polyether alcohol _____ 0.2
  Water _____ 75

Add the reaction vessel charge to a glass-lined reaction vessel fitted with a reflux condenser and an agitator. Bring the charge to reflux temperature and then slowly add the catalyst premix thereto over an 80-minute period. During the first 30 minutes of the 80-minute period, slowly add monomer premix "A" along with the first 30% of the catalyst premix and during the last 50 minutes of the 80-minute period, slowly add monomer premix "B" along with the remainder of the catalyst premix. Maintain the resultant reaction mixture at reflux temperature until the temperature peaks, at which time the polymerization reaction is substantially complete. Cool the resultant latex to room temperature and adjust the pH thereof to about 8–9 with a 28% aqueous solution of ammonia. As a result of this reaction, there is obtained a 50% solids grain- and lump-free interpolymer latex having an average particle size of about 0.2 to 0.3 micron.

*Example II*

INTERPOLYMER OF 35% 2-ETHYLHEXYL ACRYLATE, 57% STYRENE, 6% ACRYLONITRILE AND 2% METHACRYLIC ACID

Repeat Example I using the same catalyst premix and the same reaction vessel charge, but in this instance use the following monomer premixes:

Monomer premix "A": Parts
  Acrylonitrile _____ 6
  Styrene _____ 14
Monomer premix "B":
  Styrene _____ 43
  2-ethylhexyl acrylate _____ 35
  Methacrylic acid _____ 2

At the end of the polymerization reaction, there is obtained a 50% solids grain- and lump-free interpolymer latex having an average particle size of about 0.2 to 0.3 micron.

*Example III*

INTERPOLYMER OF 40% 2-ETHYLHEXYL ACRYLATE, 52% STYRENE, 6% METHACRYLONITRILE AND 2% METHACRYLIC ACID

Repeat Example I using the same catalyst premix and the same reaction vessel charge but in this instance use the following monomer premixes:

Monomer premix "A": Parts
  Methacrylonitrile _____ 6
  Styrene _____ 14
Monomer premix "B":
  Styrene _____ 38
  2-ethylhexyl acrylate _____ 40
  Methacrylic acid _____ 2

At the end of the polymerization reaction there is obtained a 50% solids grain- and lump-free interpolymer latex having an average polymer size of about 0.2 to 0.3 micron.

Example IV

INTERPOLYMER OF 40% 2-ETHYLHEXYL ACRYLATE, 30% STYRENE, 22% ALPHAMETHYL STYRENE, 6% ACRYLONITRILE AND 2% METHACRYLIC ACID

Repeat Example I using the same catalyst premix and the same reaction vessel charge but in this instance use the following monomer premixes:

Monomer premix "A": Parts
    Acrylonitrile _____ 6
    Styrene _____ 14

Monomer premix "B":
    Styrene _____ 16
    Alphamethyl styrene _____ 22
    2-ethylhexyl acrylate _____ 40
    Methacrylic acid _____ 2

At the end of the polymerization reaction, there is obtained a 50% solids grain- and lump-free interpolymer latex having an average particle size of about 0.2 to 0.3 micron.

Example V

TERPOLYMER OF 40% 2-ETHYLHEXYL ACRYLATE, 30% STYRENE, 22% 2,5-DICHLOROSTYRENE, 6% ACRYLONITRILE AND 2% METHACRYLIC ACID

Repeat Example I using the same catalyst premix and the same reaction vessel charge but in this instance use the following monomer premixes:

Monomer premix "A": Parts
    Acrylonitrile _____ 6
    Styrene _____ 14

Monomer premix "B":
    Styrene _____ 16
    2,5-dichlorostyrene _____ 22
    2-ethylhexyl acrylate _____ 40
    Methacrylic acid _____ 2

At the end of the polymerization reaction, there is obtained a 50% solids grain- and lump-free interpolymer latex having an average particle size of about 0.2 to 0.3 micron.

Example VI

TERPOLYMER OF 40% 2-ETHYLHEXYL METHACRYLATE, 50% STYRENE, 6% ACRYLONITRILE AND 4% ACRYLIC ACID

Repeat Example I using the same catalyst premix and the same reaction vessel charge but in this instance use the following monomer premixes:

Monomer premix "A": Parts
    Acrylonitrile _____ 6
    Styrene _____ 14

Monomer premix "B":
    Styrene _____ 36
    2-ethylhexyl methacrylate _____ 40
    Acrylic acid _____ 4

At the end of the polymerization reaction, there is obtained a 50% solids grain- and lump-free interpolymer latex having an average particle size of about 0.2 to 0.3 micron.

Example VII

TERPOLYMER OF 40% DECYL ACRYLATE, 52% STYRENE, 6% ACRYLONITRILE AND 2% METHACRYLIC ACID

Repeat Example I using the same catalyst premix and the same reaction vessel charge and the following monomer premixes:

Monomer premix "A": Parts
    Acrylonitrile _____ 6
    Styrene _____ 14

Monomer premix "B":
    Styrene _____ 38
    Decyl acrylate _____ 40
    Methacrylic acid _____ 2

At the end of the polymerization reaction, there is obtained a 50% solids grain- and lump-free interpolymer latex having an average particle size of about 0.2 to 0.3 micron.

Example VIII

INTERPOLYMER OF 40% TRIDECYL ACRYLATE, 52% STYRENE, 6% ACRYLONITRILE AND 2% METHACRYLIC ACID

Repeat Example I using the same catalyst premix and the same reaction vessel charge and the following monomer premixes:

Monomer premix "A": Parts
    Acrylonitrile _____ 6
    Styrene _____ 14

Monomer premix "B":
    Styrene _____ 38
    Tridecyl acrylate _____ 40
    Methacrylic acid _____ 2

As a result, there is obtained a 50% solids grain- and lump-free interpolymer latex having an average particle size of about 0.2 to 0.3 micron.

Example IX

Coat a plurality of glass plates and red cedarwood shingles with each of the latices prepared in Examples I to VIII and dry the coatings in a closed chamber maintained at a temperature of about 5° C. In each instance, hard, continuous, adherent films are formed. Hard, continuous, adherent films are also formed when the latices are dried at a temperature of 10° C. The latices will also dry to form continuous films at higher temperatures, such as room temperature.

EXAMPLES SHOWING CRITICAL NATURE OF PROPORTIONS AND CERTAIN POLYMERIZATION CONDITIONS

Example X

INTERPOLYMER OF 30% 2-ETHYLHEXYL ACRYLATE, 62% STYRENE, 6% ACRYLONITRILE AND 2% METHACRYLIC ACID

Repeat Example I using the same catalyst premix and the same reaction vessel charge and the following monomer premixes:

Monomer premix "A": Parts
    Acrylonitrile _____ 6
    Styrene _____ 14

Monomer premix "B":
    Styrene _____ 48
    2-ethylhexyl acrylate _____ 30
    Methacrylic acid _____ 2

As a result, there is obtained a 50% solids grain- and lump-free interpolymer latex having an average particle size of about 0.2 to 0.3 micron.

Coat glass plates and red cedarwood shingles with thin layers of the latex and dry the coatings in a closed chamber maintained at a temperature of about 5° C. The results are unsatisfactory, for dry, powdery, non-adherent coatings rather than continuous films are formed. Dry, powdery, non-adherent coatings are also formed when glass plates and red cedarwood shingles are coated with the latex and dried at a temperature of about 10° C.

Example XI

INTERPOLYMER OF 30% TRIDECYL ACRYLATE, 62% STYRENE, 5% ACRYLONITRILE AND 2% METHACRYLIC ACID

Repeat Example I using the same catalyst premix and the same reaction vessel charge and the following monomer premixes:

Monomer premix "A": Parts
    Acrylonitrile _____ 6
    Styrene _____ 14

Monomer premix "B":
    Styrene _____ 48
    Tridecyl acrylate _____ 30
    Methacrylic acid _____ 2

As a result, there is obtained a 50% solids grain- and lump-free interpolymer latex having an average particle size of about 0.2 to 0.3 micron.

Unsatisfactory results are obtained when glass plates and red cedarwood shingles are coated with the latex and then dried in a closed chamber maintained at a temperature of about 10° C., for dry, powdery, non-adherent coatings rather than continuous films are formed.

Example XII

INTERPOLYMER OF 40% ETHYLBUTYL ACRYLATE, 52% STYRENE, 6% ACRYLONITRILE AND 2% METHACRYLIC ACID

Repeat Example I using the same catalyst premix and the same reaction vessel charge and the following monomer premixes:

Monomer premix "A":                          Parts
    Acrylonitrile _____ 6
    Styrene _____ 14
Monomer premix "B":
    Styrene _____ 38
    Ethylbutyl acrylate _____ 40
    Methacrylic acid _____ 2

As a result, there is obtained a 50% solids grain- and lump-free interpolymer latex having an average particle size of about 0.2 to 0.3 micron.

Unsatisfactory results are obtained when glass plates and red cedarwood shingles are coated with the latex and then dried in a closed chamber maintained at a temperature of about 10° C., for dry, powdery, non-adherent coatings rather than continuous films are formed.

Example XIII

INTERPOLYMER OF 40% HEXADECYL ACRYLATE, 52% STYRENE, 6% ACRYLONITRILE AND 2% METHACRYLIC ACID

Repeat Example I using the same catalyst premix and the same reaction vessel charge and the following monomer premixes:

Monomer premix "A":                          Parts
    Acrylonitrile _____ 6
    Styrene _____ 14
Monomer premix "B":
    Styrene _____ 38
    Hexadecyl acrylate _____ 40
    Methacrylic acid _____ 2

As a result, there is obtained a 50% solids grain- and lump-free interpolymer latex having an average particle size of about 0.2 to 0.3 micron.

Unsatisfactory results are obtained when glass plates and red cedarwood shingles are coated with the latex and then dried in a closed chamber maintained at a temperature of about 5° C. for excessively soft, tacky films are formed which are unsatisfactory for surface coating applications.

Example XIV

INTERPOLYMER OF 40% 2-ETHYLHEXYL ACRYLATE, 54% STYRENE AND 6% ACRYLONITRILE

Repeat Example I using the same catalyst premix and the same reaction vessel charge and the following monomer premixes:

Monomer premix "A":                          Parts
    Acrylonitrile _____ 6
    Styrene _____ 14
Monomer premix "B":
    Styrene _____ 40
    2-ethylhexyl acrylate _____ 40

As a result, there is obtained a 50% solids interpolymer latex. However, the latex is characterized by the presence of visible lumps of polymer averaging about ¼ inch in diameter. It is necessary to filter the latex to remove the lumps and when this is done, it is found that about 5% of the original monomer charge has been converted into lumps of this nature.

Example XV

INTERPOLYMER OF 40% 2-ETHYLHEXYL ACRYLATE, 58% STYRENE AND 2% METHACRYLIC ACID

Repeat Example I using the same catalyst premix and the same reaction vessel charge. In this instance, however, use only one monomer premix which is slowly added to the emulsifier premix conjointly with all of the catalyst premix during the 80-minute addition period.

Monomer premix:                              Parts
    Styrene _____ 58
    2-ethylhexyl acrylate _____ 40
    Methacrylic acid _____ 2

As a result, there is obtained at 50% solids interpolymer latex. However, the latex is characterized by the presence of polymer particle grains, most of which are of pin-head size. Due to their comparatively small size, it is virtually impossible to remove the grains by filtering the latex.

Example XVI

INTERPOLYMER OF 40% 2-ETHYLHEXYL ACRYLATE, 52% STYRENE, 6% ACRYLONITRILE AND 2% METHACRYLIC ACID

Repeat Example I using the same catalyst premix and the same reaction vessel charge. In this instance, however, use only one monomer premix which is slowly added to the emulsifier premix conjointly with all of the catalyst premix during the 80-minute addition period.

Monomer premix:                              Parts
    Styrene _____ 52
    2-ethylhexyl acrylate _____ 40
    Acrylonitrile _____ 6
    Methacrylic acid _____ 2

As a result, there is obtained a 50% solids interpolymer latex. However, the latex is characterized by the presence of grains.

Unsatisfactory results are obtained when glass plates and red cedarwood shingles are coated with the latex and then dried in a closed chamber maintained at a temperature of about 10° C. for dry, powdery, non-adherent coatings rather than continuous films are formed.

DISCUSSION

The interpolymer latices of the present invention have many desirable properties. Thus, for example, the latices of Examples I to VIII are substantially free from lumps and grains, as initially prepared. Another important property of the interpolymer latices, as shown by Example IX, is their ability to form continuous adherent films when dried at very low temperatures of about 5–10° C.

The latices of the present invention are prepared by the aqueous emulsion interpolymerization of restricted proportions of (1) a monovinylidene aromatic hydrocarbon, (2) a restricted class of alkyl esters of acrylic or methacrylic acid (sometimes hereinafter referred to as the unsaturated ester), (3) acrylic acid or a monophenyl or monomethyl substituted derivative thereof (sometimes hereinafter referred to as the unsaturated monocarboxylic acid) and (4) acrylonitrile or methacrylonitrile (sometimes hereinafter referred to as the unsaturated nitrile).

A wide variety of monovinylidene aromatic hydrocarbons may be used in accordance with the present invention, representative of which are monomers such as styrene, alphamethyl styrene, parachlorostyrene, 2,4-dihlorostyrene, 2,5-dichlorostyrene, parabromostyrene, iaramethylstyrene, alphamethyl-paramethyl styrene, netaethyl styrene, paraisopropyl styrene, vinyl naphhalene, etc. Mixtures of two or more such compounds nay be used if desired.

The unsaturated esters to be used in accordance with he present invention are straight-chain or branched-chain iliphatic alcohol esters of acrylic or methacrylic acid. The alcohol radicals should be saturated and should conain from 5 to 20 carbon atoms. In addition. the longest ontinuous chain of the alcohol radical should contain rom 5 to 14 carbon atoms. If the alcohol radical conains a lesser number of carbon atoms or if the number of carbon atoms in the longest continuous chain is less han 5, the resultant latices will not dry to form continuus, adherent films at temperatures of about 10 C. or less. On the other hand, if the alcohol radicals contain a reater number of carbon atoms or if the number of carion atoms in the longest continuous straight chain is in xcess of 14, the resultant latices will dry to form films vhich will be too soft and tacky for surface coating aplications. Within these limitations, however, a wide ariety of acrylic and methacrylic acid esters may be used, representative of which are the esters formed by sterifying acrylic or methacrylic acid with alcohols such is amyl alcohol, hexanol, 2-ethyl hexanol, 2-methyl ientanol, the oxo alcohol of an isobutylene dimer, heptyl lcohol, 3-methyl heptyl alcohol, the oxo alcohol of an sobutylene trimer, the oxo alcohol of a propylene dimer, octyl alcohol, the oxo alcohol of a propylene tetramer, etyl alcohol, dodecyl alcohol, tridecyl alcohol, tetralecyl alcohol. etc. Mixtures of two or more such acrylic or methacrylic acid esters may be used if desired.

In addition, there should also be used an unsaturated itrile taken from the group consisting of acrylonitrile ind methacrylonitrile and an unsaturated monocarboxyic acid taken from the group consisting of acrylic acid, nethacrylic acid, cinnamic acid, atropic acid and crotonic cid. A mixture of acrylonitrile with methacrylonitrile or a mixture of two or more of the unsaturated monoarboxylic acids may also be used if desired.

MONOMER PROPORTIONS

The latices of the present invention are obtained by nterpolymerizing the above monomer components withn a specific range of proportions. The unsaturated ster component should comprise about 35–60% of the otal monomer charge, the unsaturated nitrile should omprise about 3–10% of the total monomer charge, he unsaturated monocarboxylic acid should comprise ibout 2–5% of the total monomer charge and the renainder of the monomer charge (i. e., the remaining 50–25%) should comprise the monovinylidene aromatic iydrocarbon. Latices prepared by interpolymerizing the nonomeric components in the above proportions in acordance with the present invention will generally dry to orm continuous films at a temperature of about 10° C. or less. In accordance with a preferred form of the nvention, about 35–45% of unsaturated ester, 3–10% of unsaturated nitrile, 2–5% of unsaturated monocarioxylic acid and 60–40% of monovinylidene aromatic iydrocarbon are interpolymerized to form latices which vill dry to form continuous films at a temperature of ibout 5° C. or even less.

If the unsaturated ester component comprises less than ibout 35% of the total monomer charge, the resultant atex will not possess the desired low temperature drymg properties whereas excessively soft or even tacky ilms will be formed if more than about 60% of unaturated ester is used. The latices are characterized by the presence of lumps, grains or both when the unaturated nitrile, the unsaturated monocarboxylic acid ir both are eliminated from the formulation or used in mproper amounts.

THE POLYMERIZATION REACTION

The latices of the present invention are prepared by a special aqueous emulsion polymerization reaction, as hereinafter more fully explained, of the general type wherein the monomers to be polymerized are slowly added to an aqueous reaction vessel charge at the temperature of polymerization, an aqueous solution of polymerization catalyst and emulsifier being added along with the monomers.

A wide variety of emulsifying agents may be used alone or in admixture, such as salts of high molecular weight fatty acids, amino soaps, alkali metal salts of rosin acids, alkali metal salts of long-chain alkyl sulfates and sulfonates, ethylene oxide condensates of long-chain fatty acids, alcohols or mercaptans, sodium salts of sulfonated hydrocarbons, alkaryl sulfonates, etc. Representative emulsifiers include compounds such as sodium oleate, triethanol amine, sodium lauryl sulfate, salts of sulfosuccinic acid esters, the 2-ethylhexyl ester of sulfosuccinic acid, sodium salts of dioctyl sulfosuccinic acids, sodium salts of sulfated cetyl alcohol, etc. It is generally desirable to use about 0.1 to 5 parts of emulsifier per 100 parts of monomer mixture although somewhat greater or lesser amounts may be used if desired.

Representative of the polymerization catalysts are compounds such as potassium persulfate, benzoyl peroxide, lauroyl peroxide, ditertiary butyl peroxide, cumene hydroperoxide, azo-bis-isobutyronitrile, etc. Mixtures of two or more such polymerization catalysts may also be used if desired. The amount of catalyst to be used will generally fall within the range of about 0.01 to 1 part of polymerization catalyst per 100 parts of monomer mixture. Somewhat greater or lesser amounts of catalyst may be used if desired.

The amount of water to be used may be varied within comparatively wide limits. It is generally preferable, however, to use from about 100 to 250 parts of water per 100 parts of monomer mixture in order that the latices will have a solids content of about 50–30%. The amount of water may be increased or decreased, if desired, in order to provide a latex having a somewhat higher or lower solids content (e. g., 25–60%).

The various ingredients to be used in conducting the polymerization reaction are conveniently used in the form of an initial reaction vessel charge, a catalystemulsifier premix and two separate monomer premixes.

The initial reaction vessel charge comprises a major portion of the water to be used. It may also optionally contain a minor amount of the emulsifier, a minor amount of the catalyst, or both. The catalyst-emulsifier premix comprises a minor amount of the water to be used, and contains all or a major portion of the polymerization catalyst and all or a major portion of the emulsifier. Suitable quantities of conventional polymerization aids such as buffers, particle size regulators, activators, etc. may also be present in the reaction vessel charge, the catalyst-emulsifier premix, or both.

The first monomer premix should consist of all of the unsaturated nitrile component in admixture with from about 1½ to 3 times its weight of monovinylidene aromatic hydrocarbon. The second monomer premix should comprise the remainder of the monomer charge.

In order to prepare latices in accordance with the present invention, the initial reaction vessel charge is first added to a suitable reaction vessel and the charge is then preferably brought to the desired reaction temperature and pressure before adding the remaining ingredients. The temperature may be varied within comparatively wide limits so that, for example, a temperature of from about 30° C. to 150° C. may be used with satisfactory results. The reaction should be conducted under pressure if a temperature above reflux temperature is to be used but it is preferably conducted at atmospheric pressure at reflux temperature or less. In general, the reaction is best controlled if conducted at atmospheric pressure and reflux temperature. The polymerization reaction is preferably conducted in the absence of oxygen. Oxygen may be removed from the reaction vessel by any suitable means such as purging with nitrogen, bringing the reaction vessel charge to reflux temperature, etc.

After the initial reaction vessel charge has been brought to the desired temperature and pressure and the reaction vessel substantially purged of oxygen, the catalyst-emulsifier premix and the two monomer premixes are slowly added with agitation in a special manner over about a 1–2 hour period. The catalyst-emulsifier premix is slowly added during the entire period. The first monomer premix is slowly added to the initial reaction vessel charge along with the first 25–40% of the catalyst-emulsifier premix and the second monomer premix is slowly added along with the remainder of the catalyst-emulsifier premix.

As a general rule, the polymerization reaction is incomplete at the end of the addition period and, as a result, in order to bring the reaction to substantial completion, it is generally necessary to maintain the reaction mixture at a temperature of polymerization for an additional period of time, usually about 1–20 hours. If the reaction is conducted at reflux temperature, it is substantially complete when a substantially constant boiling point is reached. A small percentage of unreacted monomer (e. g., about 5%) is present in the latex at the end of the polymerization reaction and, if desired, may be removed by any suitable means such as distillation, etc.

By conducting the polymerization reaction in this fashion, there is obtained an interpolymer latex that is substantially free from lumps and grains. The polymer particles in the latex will have an average particle size in the range of from about 0.1 to 0.5 micron and the latex will dry to form a continuous film at a temperature of about 2–10° C. or higher.

The latices of the present invention, as initially prepared, will normally have an acid pH. They may be used in this acid condition with satisfactory results. However, it is generally preferable that the pH of the latices be adjusted to a pH of about 8–9 through the addition of a suitable amount of a basic material such as ammonia or an alkali metal or ammonium salt of a water-soluble organic or inorganic acid.

As has been indicated, the latices of the present invention are of particular utility in the preparation of surface coating compositions and for such use are conventionally compounded with suitable pigments, fillers, protective colloiding agents, thickening agents, latex stabilizing agents, etc.

What is claimed is:

1. In a process for preparing a latex by interpolymerizing about 35–60 parts by weight of an unsaturated ester, about 3–10 parts by weight of an unsaturated nitrile, about 2–5 parts by weight of an unsaturated monocarboxylic acid and, correspondingly, about 60–25 parts by weight of a monovinylidene aromatic hydrocarbon, by an aqueous emulsion interpolymerization reaction of the type wherein an aqueous premix containing a polymerization catalyst and an emulsifier is slowly added to an aqueous reaction vessel charge said charge comprising a major portion of the water requirement, with agitation at the temperature of polymerization, the improvement which comprises slowly adding a mixture of the unsaturated nitrile with about 1½ to 3 times its weight of monovinylidene aromatic hydrocarbon to the aqueous reaction vessel charge along with the first 25–40% of the said catalyst-emulsifier premix, adding a mixture of the remainder of the monomers to the aqueous reaction vessel charge along with the remainder of the said catalyst-emulsifier premix and maintaining the resultant reaction mixture at the temperature of polymerization until the reaction is substantially complete, said unsaturated ester being taken from the group consisting of straight-chain and branched-chain saturated aliphatic alcohol esters of acrylic and methacrylic acids containing a total of about 5–20 carbon atoms in the alcohol radical of which about 5–14 carbon atoms comprise the longest continuous chain thereof, said unsaturated nitrile being taken from the group consisting of acrylonitrile and methacrylonitrile and said unsaturated monocarboxylic acid being taken from the group consisting of acrylic acid, methacrylic acid, cinnamic acid, atropic acid and crotonic acid.

2. In a process for preparing a latex by interpolymerizing (1) about 35–60 parts by weight of an unsaturated ester taken from the group consisting of straight-chain and branched-chain saturated aliphatic alcohol esters of acrylic and methacrylic acid containing a total of about 5–20 carbon atoms in the alcohol radical of which 5–14 carbon atoms comprise the longest continuous chain thereof, (2) about 3–10 parts by weight of acrylonitrile, (3) about 2–5 parts by weight of methacrylic acid and, correspondingly, (4) about 60–25 parts by weight of styrene, by an aqueous emulsion polymerization reaction of the type wherein an aqueous premix containing a polymerization catalyst and an emulsifier is slowly added to an aqueous reaction vessel charge with agitation at the temperature of polymerization, the improvement which comprises slowly adding a mixture of the acrylonitrile with about 1½ to 3 times its weight of styrene to the reaction vessel charge said charge comprising a major portion of the water requirement, along with the first 25–40% of the said catalyst-emulsifier premix, adding a mixture of the remainder of the monomers to the reaction vessel charge along with the remainder of the said catalyst-emulsifier premix, and maintaining the resultant mixture at polymerization temperature until the reaction is substantially complete.

3. In a process for preparing a latex by interpolymerizing (1) about 35–45 parts by weight of 2-ethylhexyl acrylate, (2) about 3–10 parts by weight of acrylonitrile, (3) about 2–5 parts by weight of methacrylic acid and, correspondingly, (4) about 60–40 parts by weight of styrene by an aqueous emulsion polymerization reaction of the type wherein an aqueous premix containing a polymerization catalyst and an emulsifier is slowly added to an aqueous reaction vessel charge with agitation at the temperature of polymerization, the improvement which comprises slowly adding a mixture of the acrylonitrile with about 1½ to 3 times its weight of styrene to the reaction vessel charge along with the first 25–40% of the said catalyst-emulsifier premix, adding a mixture of the remainder of the monomers to the reaction vessel charge along with the remainder of the said catalyst-emulsifier premix, and maintaining the resultant mixture at polymerization temperature until the reaction is substantially complete.

4. A process as in claim 3 wherein about 40 parts of 2-ethylhexyl acrylate are interpolymerized with about 6 parts of acrylonitrile, about 2 parts of methacrylic acid and about 52 parts of styrene, wherein the catalyst-emulsifier premix is added to the aqueous reaction vessel charge over about an 80-minute period and wherein the mixture of acrylonitrile with styrene is added to the aqueous reaction vessel charge during the first 30 minutes of the said 80-minute period.

5. In a process for preparing a latex by interpolymerizing (1) about 35–45 parts by weight of decyl acrylate, (2) about 3–10 parts by weight of acrylonitrile, (3) about 2–5 parts by weight of methacrylic acid and, correspondingly, (4) about 60–40 parts by weight of styrene by an aqueous emulsion polymerization reaction of the type wherein an aqueous premix containing a polymerization catalyst and an emulsifier is slowly added to an aqueous reaction vessel charge with agitation at the temperature of polymerization, the improvement which comprises slowly adding a mixture of the acrylonitrile with about 1½ to 3 times its weight of styrene to the reaction vessel charge along with the first 25–40% of the said catalyst-emulsifier premix, adding a mixture of the remainder of the monomers to the reaction vessel charge along with the remainder of the said catalyst-emulsifier premix, and maintaining the resultant mixture at polymerization temperature until the reaction is substantially complete.

6. A process as in claim 5 wherein about 40 parts of decyl acrylate are interpolymerized with about 6 parts of acrylonitrile, about 2 parts of methacrylic acid and about 52 parts of styrene, wherein the catalyst-emulsifier premix is added to the aqueous reaction vessel charge over about an 80-minute period and wherein the mixture of acrylonitrile with styrene is added to the aqueous reaction vessel charge during the first 30 minutes of the said 80-minute period.

7. In a process for preparing a latex by interpolymerizing (1) about 35–45 parts by weight of tridecyl acrylate, (2) about 3–10 parts by weight of acrylonitrile, (3) about 2–5 parts by weight of methacrylic acid and, correspondingly, (4) about 60–40 parts by weight of styrene by an aqueous emulsion polymerization reaction of the type wherein an aqueous premix containing a polymerization catalyst and an emulsifier is slowly added to an aqueous reaction vessel charge with agitation at the temperature of polymerization, the improvement which comprises slowly adding a mixture of the acrylonitrile with about 1½ to 3 times its weight of styrene to the reaction vessel charge along with the first 25–40% of the said catalyst-emulsifier premix, adding a mixture of the remainder of the monomers to the reaction vessel charge along with the remainder of the said catalyst-emulsifier premix, and maintaining the resultant mixture at polymerization temperature until the reaction is substantially complete.

8. A process as in claim 7 wherein about 40 parts of tridecyl acrylate are interpolymerized with about 6 parts of acrylonitrile, about 2 parts of methacrylic acid and about 52 parts of styrene, wherein the catalyst-emulsifier premix is added to the aqueous reaction vessel charge over about an 80-minute period and wherein the mixture of acrylonitrile with styrene is added to the aqueous reaction vessel charge during the first 30 minutes of the said 80-minute period.

9. An aqueous interpolymer latex capable of drying to form a continuous adherent film at a temperature of about 10° C., said interpolymer being an interpolymer of (1) about 35–60 parts by weight of an unsaturated ester taken from the group consisting of straight-chain and branched-chain saturated aliphatic alcohol esters of acrylic and methacrylic acid containing a total of about 5–20 carbon atoms in the alcohol radical of which about 5–14 carbon atoms comprise the longest continuous chain thereof, (2) about 3–10 parts by weight of an unsaturated nitrile taken from the group consisting of acrylonitrile and methacrylonitrile, (3) about 2–5 parts by weight of an unsaturated monocarboxylic acid taken from the group consisting of acrylic acid, methacrylic acid, cinnamic acid, atropic acid and crotonic acid and, correspondingly, (4) about 60–25 parts by weight of a monovinylidene aromatic hydrocarbon, the interpolymer particles in said latex having an average diameter of about 0.1 to 0.5 micron.

10. An aqueous interpolymer latex capable of drying to form a continuous film at a temperature of about 5° C., said interpolymer being an interpolymer of about 35–45 parts by weight of 2-ethylhexyl acrylate, (2) about 3–10 parts by weight of acrylonitrile, (3) about 2–5 parts by weight of methacrylic acid, and, correspondingly, (4) about 60–40 parts by weight of styrene, the interpolymer particles in said latex having an average diameter of about 0.1 to 0.5 micron.

11. An aqueous interpolymer latex capable of drying to form a continuous film at a temperature of about 5° C., said interpolymer being an interpolymer of (1) about 35–45 parts by weight of decyl acrylate, (2) about 3–10 parts by weight of acrylonitrile, (3) about 2–5 parts by weight of methacrylic acid and, correspondingly, (4) about 60–40 parts by weight of styrene, the interpolymer particles in said latex having an average diameter of about 0.1 to 0.5 micron.

12. An aqueous interpolymer latex capable of drying to form a continuous film at a temperature of about 5° C., said interpolymer being an interpolymer of (1) about 35–45 parts by weight of tridecyl acrylate, (2) about 3–10 parts by weight of acrylonitrile, (3) about 2–5 parts by weight of methacrylic acid and, correspondingly, (4) about 60–40 parts by weight of styrene, the interpolymer particles in said latex having an average diameter of about 0.1 to 0.5 micron.

13. An interpolymer prepared by the process of claim 1.

14. An interpolymer prepared by the process of claim 3.

15. An interpolymer prepared by the process of claim 5.

16. An interpolymer prepared by the process of claim 7.

References Cited in the file of this patent

Serial No. 397,138, Fikentscher et al. (A. P. C.), published May 11, 1943.